(12) United States Patent
Sung et al.

(10) Patent No.: US 8,202,818 B2
(45) Date of Patent: *Jun. 19, 2012

(54) CATALYST COMPOSITION FOR PREPARING CARBON NANOTUBE

(75) Inventors: Hyun-Kyung Sung, Daejeon (KR); Wan Sung Lee, Daejeon (KR); Namsun Choi, Daejeon (KR); Dong Hwan Kim, Daejeon (KR); Youngchan Jang, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 440 days.

This patent is subject to a terminal disclaimer.

(21) Appl. No.: 12/453,862

(22) Filed: May 26, 2009

(65) Prior Publication Data

US 2010/0167053 A1 Jul. 1, 2010

(30) Foreign Application Priority Data

Dec. 29, 2008 (KR) .................. 10-2008-0135348

(51) Int. Cl.
| | |
|---|---|
| *B01J 21/00* | (2006.01) |
| *B01J 23/20* | (2006.01) |
| *B01J 23/00* | (2006.01) |
| *B01J 23/32* | (2006.01) |
| *B01J 23/58* | (2006.01) |
| *B01J 23/70* | (2006.01) |
| *D01C 5/00* | (2006.01) |
| *B32B 5/16* | (2006.01) |

(52) U.S. Cl. ........ 502/248; 502/354; 502/247; 502/241; 502/242; 502/244; 502/312; 502/324; 502/328; 502/337; 502/325; 423/447.3; 428/402; 977/742; 977/843

(58) Field of Classification Search .................. None
See application file for complete search history.

(56) References Cited

U.S. PATENT DOCUMENTS 5,165,909 A 11/1992 Tennent
8,048,821 B2 * 11/2011 Ryu et al. .................. 502/324

OTHER PUBLICATIONS

Z. Kónya et al., "XPS Study of multiwall carbon nanotube synthesis on Ni-, V-, and Ni,V-ZSM-5 catalysts," Applied Catalysis A: General, 2004, vol. 260, pp. 55-61.
S. Takenaka et al., "Formation of Carbon Nanofibers and Carbon Nanotubes through Methane Decomposition over Supported Cobalt Catalysts," The Journal of Physical Chemistry B, 2004, vol. 108, pp. 11464-11472.
Sumio Iijima, "Helical microtubules of graphitic carbon," Nature, Nov. 7, 1991, vol. 354, pp. 56-58.

* cited by examiner

*Primary Examiner* — Melvin C Mayes
*Assistant Examiner* — Guinever Gregorio
(74) *Attorney, Agent, or Firm* — Jacobson Holman PLLC

(57) ABSTRACT

The present invention relates to a catalyst composition for preparing carbon nanotube and a process for preparing carbon nanotube using the same. More particularly, this invention relates to a process for preparing carbon nanotube by the chemical vapor deposition method through the decomposition of lower saturated or unsaturated hydrocarbons using a multi-component metal catalyst composition containing active metal catalyst from Co, V, Al and inactive porous support. Further, the present invention affords the carbon nanotube having 5~30 nm of diameter and 100~10,000 of aspect ratio in a high catalytic yield.

5 Claims, 2 Drawing Sheets

CATALYST COMPOSITION FOR PREPARING CARBON NANOTUBE

This application has a priority of Korean no. 10-2008-135348 filed Dec. 29, 2008, hereby incorporated by reference.

BACKGROUND OF THE INVENTION

1. Field of the Invention

The present invention relates to a catalyst composition for preparing carbon nanotube and a process for preparing carbon nanotube using the same. More particularly, this invention relates to a process for preparing carbon nanotube by the chemical vapor deposition method through the decomposition of lower saturated or unsaturated hydrocarbons using a multi-component metal catalyst composition containing active metal catalyst from Co, V, Al and inactive porous support. Further, the present invention affords the carbon nanotube having 5~30 nm of diameter and 100~10,000 of aspect ratio in a high catalytic yield.

2. Description of Prior Art

Carbon nanotube has a hexagonal honey comb shape in which one carbon atom is bonded with 3 adjacent carbon atoms. Further, the graphite plane is rolled in a round shape having a nano size diameter. Specific physical properties are shown according to the size or shape of carbon nanotube. The weight is comparatively low due to the hollow type. Further, the electrical conductivity is as good as that of copper, as well as the thermal conductivity is as good as that of diamond. Of course, the tensile strength is not less than that of iron. According to the rolled shape of carbon nanotubes, it can be classified as single walled nanotube, multi-walled nanotube and rope nanotube.

Such carbon nanotube can be generally manufactured by arc-discharge method, laser vaporization method, plasma enhanced chemical vapor deposition method, thermal chemical vapor deposition method, vapor phase growth method or electrolysis method. Among them, chemical vapor deposition method has been preferably used, because the deposition of carbon nanotube can be made by the direct reaction between hydrocarbon gas and metal catalyst without using the substrate plate. Further, high purity of carbon nanotube can be economically manufactured in a large amount according to chemical vapor deposition method.

In chemical vapor deposition method, the metal catalyst is necessarily required. Among the metals, Ni, Co or Fe has been commonly used. Each particle of metal catalysts can act as seed for the formation of carbon nanotube. Therefore, the metal catalyst has been required to be formed as nano size particle. Of course, many researches for developing metal catalyst have been tried.

As a preparation method of metal catalyst reported until now, following preparation methods have been disclosed. First, the method comprising i) preparing a solution containing catalytic metals and support, ii) co-precipitating the catalyst composition by adjusting pH, temperature and/or amount of ingredients, and iii) heat treating under air or other gas atmosphere has been disclosed. Second, the method by drying or evaporating the suspension containing catalytic metal and fine grain support has been disclosed. Third, the method comprising i) ionizing the metal by mixing catalytic metal salt with cation particle support such as zeolite, and ii) reducing the ionized metal into metal particle by hydrogen or other reducing agent at high temperature has been disclosed. Fourth, the method by calcinating catalytic metal with solid oxide support, such as, magnesia, alumina and/or silica has been disclosed. Finally, the method of calcination for a metal composition has been disclosed where spray drying of a catalytic metal precursor solution has been performed before calcination.

In case of catalytic chemical vapor deposition method, acetylene, methane, ethane, ethylene, butane, butene, butadiene, benzene and/or other hydrocarbon can be disclosed as a carbon source. In general, metal catalyst contains metal, metal oxide or reducible metal components. For example, Fe, Mo, Ni, V, Mn, Sn, Co or Cu has been described as a metal. Even though carbon nanotube can be made by each metal catalyst, it has been reported that a metal catalyst composition has been used to enhance the catalytic yield of carbon nanotube.

The formation of carbon nanotube and the characteristics of the formed carbon nanotube can be varied by the metal catalyst or other production conditions. Metal component of catalyst, the combination of metal components, support material, the interaction between catalytic metal and support material, the kind of gas as carbon source, hydrogen or other gas atmosphere, reaction temperature, reaction time and shape of reactor can influence the formation and characteristics of carbon nanotube. Therefore, the optimization of reaction process has been continuously required.

According to catalytic chemical deposition method, the metal catalytic components are slowly consumed in the process of synthesizing carbon nanotube. This consumption of metal catalytic components is caused by the inactivation of metal components by encapping, where carbon atoms encapsulate metal catalytic particle. Generally, re-activation of inactivated catalytic metal is neither possible, nor economical. In some cases, only few grams of carbon nanotube can be obtained using 1 gram of a metal catalyst composition including metal catalyst and support material. Therefore, the development of a high yield metal catalyst composition and of synthetic conditions has been required in order to produce the carbon nanotube in a commercially available scale.

Following technologies have been reported in patent disclosures and references until now.

The method for preparing carbon nanotube was firstly disclosed by Dr. Iijima in Nippon Electric Company (NEC). For preparing single walled carbon nanotube, carbon arc method by arcing the carbon rod containing metal catalyst has been used (S. Iijima, Nature, 354, 56 (1991)). Recently, HIPCO method (high pressure carbon monoxide method) by Dr. R. E. Smalley as well as methane decomposing method using metal catalyst has been disclosed.

On the other hand, in case of preparing multi-walled carbon nanotube, thermal chemical vapor deposition method using carbon monoxide, acetylene or methane as a carbon source in the presence of transition metal catalyst, such as, Fe, Co or Ni as well as arc-discharge method by arcing carbon rod disclosed by Dr. Iijima has been used. Further, catalytic thermal decomposition method has been also used.

According to U.S. Pat. No. 5,165,909 by Hyperion Catalysis International Inc., a method for producing carbon fibrils which comprises i) calcinating a catalyst composition at about 500° C. under air atmosphere after Fe catalyst is supported by $Al_2O_3$, ii) reducing the catalyst composition using hydrogen gas at about 900° C., and iii) preparing carbon fibrils by reacting benzene as a carbon source under hydrogen atmosphere at about 1,000° C. has been disclosed. However, the catalytic yield for preparing carbon fibril is not so good. Further, the process for preparing metal catalyst requires complicate steps of calcination and reduction as well as more than 800° C. of high reaction temperature.

S. Takenaka disclosed a method for preparing carbon nanofiber or carbon nanotube using the catalyst composition impregnating cobalt metal salt into Mg, Al, Si and/or Ti metal oxide, followed by pre-reducing said catalyst composition using hydrogen gas at about 500° C. (J. Phys. Chem. B 2004, 108, 11464-11472). Further, carbon nano materials are prepared using methane as a carbon source. However, the conversion ratio from methane to carbon nano material is less than 10 wt % regarding all 4 kinds of metal oxide catalysts. Therefore, this catalyst composition cannot be applied to a commercial use due to its low efficiency.

According to disclosure of Applied Catalysis A: General 260 (2004) 55~61 by Z. Konya, carbon nanotube preparation method comprising i) impregnating less than 5 wt % of Ni and V metal salt into zeolite support, ii) calcinating the catalyst composition at 700° C. and iii) flowing 30 ml/min of acetylene as a carbon source with 300 ml/min of nitrogen carrier gas in order to synthesize carbon nanotube has been disclosed. Z. Konya also disclosed an analysis method to investigate catalytic active species using XPS study. However, either the catalytic yield or conversion rate of carbon source has not been disclosed.

In order to solve above problems, such as, low catalytic yield, calcination of catalyst, pre-reducing treatment of catalyst, the flowing hydrogen gas with carbon source and more than 800° C. of high reaction temperature, the inventors of present invention developed a novel catalyst composition and preparation method of carbon nanotube using the same. According to the catalyst composition of present invention, the catalytic yield can be enhanced more than 3 times compared to a formerly developed catalyst composition. Further, carbon nanotube having 5~30 nm of diameter can be obtained in a short reaction time.

SUMMARY OF THE INVENTION

The object of present invention is to provide a catalyst composition for preparing carbon nanotube represented by following formula.

$$[Co_xV_yM1_z]_pM2_q$$

wherein

Co represents catalytic metal of cobalt, its oxide or its derivative;

V represents catalytic metal of vanadium, its oxide or its derivative;

M1 represents at least one catalytic transition metal selected from Al, Fe, Ni, W, Cr, Mn, Sn, Cu, Y, Zr, Ti, Mo or Si, its oxide or its derivative;

M2 represents inactive porous support selected from Mg or Si, its oxide or its derivative;

p and q represent mole fraction of catalytic metal and inactive porous support, respectively.

$$p+q=1, 0.05 \leq p \leq 0.95, 0.05 \leq q \leq 0.95,$$

x, y and z represent mole fraction of Co, V and M1, respectively.

$$x+y+z=1, 0.03 \leq x \leq 0.75, 0.02 \leq y \leq 0.75, 0.01 \leq z \leq 0.95.$$

Further, M1 preferably represents Al and M2 preferably represents Mg.

Further, the mole fraction of catalytic metal and inactive porous support is preferably $0.10 \leq p \leq 0.90$, $0.10 \leq q \leq 0.90$, respectively;

Further, the mole fraction of Co, V and M1 is preferably $0.10 \leq x \leq 0.60$, $0.10 \leq y \leq 0.60$, $0.05 \leq z \leq 0.70$, respectively.

The other object of the present invention is to provide a process for preparing a catalyst composition for synthesizing carbon nanotube comprising i) co-precipitating or coordinated precipitating a multi-component catalyst composition comprising catalytic metal salt and inactive porous support; ii) filtering, drying and grinding the obtained co-precipitated catalyst composition; and iii) calcinating the obtained catalyst composition at 400~800° C. under air atmosphere.

In a co-precipitating or coordinated precipitating step, MgO, a component of inactive porous support, is operated as a co-precipitating agent by directly bonding with catalytic metal salt.

On the other hand, the further object of the present invention is to provide a process for preparing carbon nanotube comprising i) preparing a catalyst composition for the synthesis of carbon nanotube; ii) supplying at least one carbon source selected from saturated or unsaturated hydrocarbon having 1~4 carbon atoms to the reactor at 500~800° C.; and iii) growing and synthesizing carbon nanotube by decomposition of supplied carbon source on the surface of a catalyst composition according to chemical vapor deposition method.

At the time of supplying carbon source, only gas phase of carbon source is supplied without mixing hydrogen gas which acts as a catalyst reducing agent.

According to the method for preparing carbon nanotube, carbon nanotube having 5~30 nm of diameter and 100~10,000 of aspect ratio can be obtained.

The further object of present invention is to provide a method for using carbon nanotube as electro-conductive and strength enhanced polymer composite material, support material of fuel battery catalyst, support material of organic process catalyst, storage material for methane and hydrogen gas, electrode material of lithium secondary battery, conductive material of lithium secondary battery, electrode material for high double layer capacitor, emitting material for display and membrane material.

DETAILED DESCRIPTION OF THE INVENTION

Figure 1:
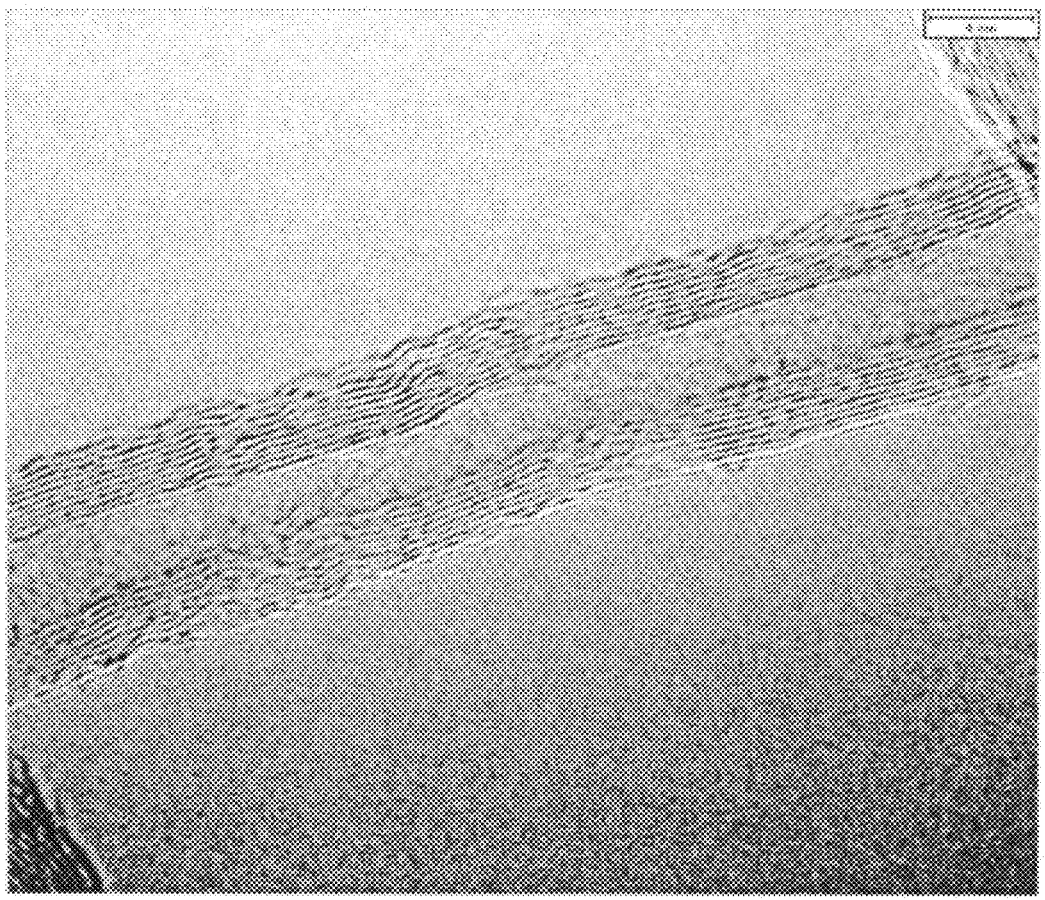
FIG. 1 shows a HR-TEM (Transmission Electron Microscope) photograph of carbon nanotube prepared by catalyst 5 of present invention.
Figure 2:
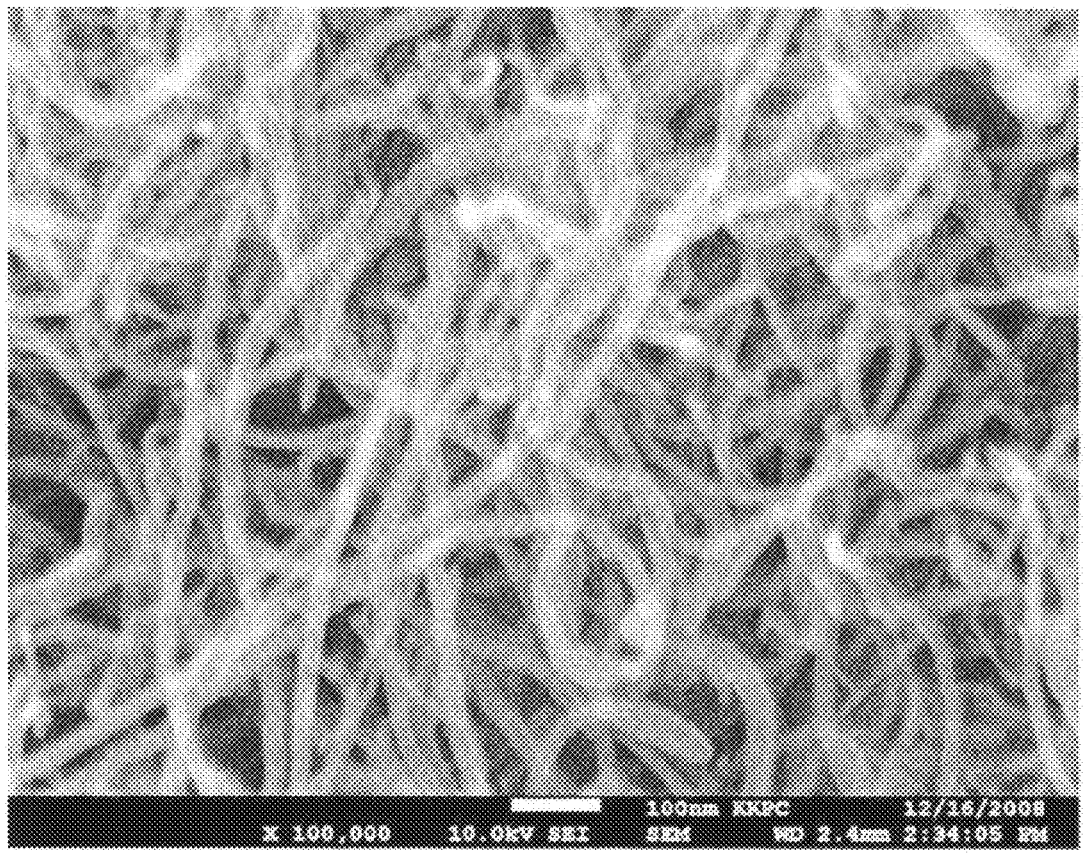
FIG. 2 shows a FE-SEM (Scanning Electron Microscope) photograph of carbon nanotube prepared by catalyst 5 of present invention.

Present invention relates to a catalyst composition for preparing carbon nanotube represented by following formula.

$$[Co_xV_yM1_z]_pM2_q$$

wherein

Co represents catalytic metal of cobalt, its oxide or its derivative;

V represents catalytic metal of vanadium, its oxide or its derivative;

M1 represents at least one catalytic transition metal selected from Al, Fe, Ni, W, Cr, Mn, Sn, Cu, Y, Zr, Ti, Mo or Si, its oxide or its derivative;

M2 represents inactive porous support selected from Mg or Si, its oxide or its derivative;

p and q represent mole fraction of catalytic metal and inactive porous support, respectively, $$p+q=1, 0.05 \leq p \leq 0.95, 0.05 \leq q \leq 0.95,$$

x, y and z represent mole fraction of Co, V and M1, respectively.

$$x+y+z=1, 0.03 \leq x \leq 0.75, 0.02 \leq y \leq 0.75, 0.01 \leq z \leq 0.95.$$

Further, the present invention also relates to a process for preparing a catalyst composition for synthesizing carbon nanotube comprising i) co-precipitating or coordinated precipitating a multi-component catalyst composition comprising catalytic metal salt and inactive porous support; ii) filtering, drying and grinding the obtained co-precipitated catalyst composition; and iii) calcinating the obtained catalyst composition at 400~800° C. under air atmosphere.

In a co-precipitating or coordinated precipitating step, at least one of catalytic metal salt solution, metal oxide dispersion or inactive metal salt solution can be added in a continuous process. Further, a selected amount of a co-precipitating agent can be also added.

On the other hand, a catalytic metal solution contains at least one catalytic metal in the form of solution or dispersion. Appropriate catalytic metal can be exemplified as Fe, Ni, Co, W, V, Cr, Mn, Sn, Cu, Y, Zr, Ti, Mo, Si or Al.

Further, the preferred catalytic metal can be Co, V and Al. The amount of catalytic metal as to total amount of a catalyst composition is 5~95 mol %. The preferred amount of catalytic metal is 10~90 mol %. According to present invention, the amount and kinds of catalytic metal as to total amount of a catalyst composition are 3~75 mol % of Co, 2~75 mol % of V and 1~95 mol % of Al. Further, 10~60 mol % of Co, 10~60 mol % of V and 5~70 mol % of Al are preferred.

In case of V, this metal can be added as a co-catalyst or supplemented catalyst in the catalyst composition of present invention. If V is not contained in the catalyst composition, the catalytic yield is only 130% according to a CoMg catalyst composition and the catalytic yield is only 300% according to a CoAlMg catalyst composition as shown in Comparative Examples. However, if V is contained in the catalyst composition, the catalytic yield is enhanced into 7790% according to a CoVAlMg catalyst composition as shown in Examples of present invention.

Appropriate inactive porous support can be Mg or Si. Preferred inactive porous support is Mg. The amount of inactive porous support as to a total catalyst composition is 5~95 mol %, preferably, 10~90 mol %.

In a co-precipitating or coordinated precipitating step, the various kinds of metal salts or metal oxides can be added in the form of powder, on condition that these metals can be co-precipitated in the solvent. As a metal salt, acetic acid salt, nitric acid salt, chloride compound or any soluble salts can be exemplified. The preferred solvent in a co-precipitating or coordinated precipitating step can be exemplified as methanol, ethanol, n-propanol, propanol, butanol, water or mixture of them. The preferred solvent is water.

In a co-precipitating or coordinated precipitating step, the precipitation can be induced by adding a precipitating agent. The preferred precipitating agent can be exemplified as ammonium hydrogen carbonate, ammonium hydroxide, alkali metal or alkali earth metal carbonate, alkali metal or alkali earth metal hydroxide or MgO powder. MgO powder is preferred. Further, coordinated precipitation can be made at the time of using MgO powder as a precipitating agent.

Next, the catalyst composition can be separated from co-precipitating solution by filtering using filter paper, centrifuge, evaporation and concentration. The obtained material can be further washed, followed by drying. Appropriate drying condition is 50~250° C., preferably 100~200° C. under air atmosphere.

In this step, the dried catalyst agglomerate can be grinded using grinding machine. The grinding method can be exemplified as ball-milling method or mechanical high rotation grinding method. Further, conditioning process may be required as to grinded catalyst powder. This conditioning process contains a calcination step under air atmosphere. Appropriate calcinating temperature is 300~900° C., preferably 400~800° C. If necessary, additional reduction pre-treatment may be required to the calcinated catalyst powder.

For the preparation of carbon nanotube, a grinded or calcinated catalyst composition can be set in the vertical or horizontal fixed-bed quartz furnace. Then, saturated or unsaturated hydrocarbon gas having 1~4 carbon atoms is supplied at 500~800° C. Carbon nanotube can be prepared on the surface of catalyst in a high yield. Various kinds of reactor can be used for preparing carbon nanotube. For example, vertical fixed-bed reactor, horizontal fixed-bed reactor, rotational pipe reactor, mobile bed reactor or fluidized bed reactor can be used.

In preparation method of carbon nanotube, the supply of a catalyst composition and the recovery of carbon nanotube can be carried out in a continuous or discontinuous process. For the synthesis of carbon nanotube, carbon source gas, such as, methane, ethane, propane, butane, ethylene, propylene, butene or butadiene has to be supplied. Of course, hydrogen gas or inert gas can be supplied together with carbon source gas. Supplying only carbon source gas is preferred. The reaction can be performed under the pressure of 0.1~2 bar as well as at the temperature of 400~1,000° C. However, the reaction conditions have to be controlled to make a deposition of carbon in an appropriate rate without auto-decomposition of gas phase hydrocarbon. The preferred reaction temperature is 500~800° C.

The multi-component metal catalyst powder of present invention can be in the form of powder after drying and grinding or in the form of calcinated powder. The form of calcinated powder is preferred. After finishing synthesis of carbon nanotube, catalyst component in the carbon nanotube can be removed by a physical or chemical method. For this purpose, the obtained carbon nanotube can be treated with acid or base as well as heat treatment at high temperature.

According to preparation method of present invention, carbon nanotube having 5~30 nm of diameter can be prepared in the 5 times high yield compared to conventional methods. Further, additional removal of catalyst in the carbon nanotube may not be required, because the obtained carbon nanotube according to present invention shows very low level of remaining catalyst component in the carbon nanotube. However, the obtained carbon nanotube can be physically or chemically treated for introducing a functional group to the surface of carbon nanotube or burning impure carbon materials.

The obtained carbon nanotube of present invention can be used as electro-conductive and strength enhanced polymer composite material, support material of fuel battery catalyst, support material of organic process catalyst, storage material for methane and hydrogen gas, electrode material of lithium secondary battery, conductive material of lithium secondary battery, electrode material for high double layer capacitor, emitting material for display and membrane material.

The present invention can be explained more concretely by following Examples and Comparative Examples. However, the scope of the present invention shall not be limited by following Examples.

EXAMPLES

Example 1

Preparation of Catalyst for Preparing Carbon Nanotube

Following catalysts 1~7 have been prepared.

Catalyst 1 (21.1Co/21.0V/10.4Fe/47.5Mg):

Each of 21.24 g of $Co(NO_3)_2.6H_2O$, 6.61 g of $V_2O_5$, 14.47 g of $Fe(NO_3)_3.9H_2O$ 6.63 g of MgO is separately dissolved in 100 ml of deionized water. The obtained 4 solutions are mixed into 1 solution at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. Finally, 20.32 g of catalyst 1 is obtained. The mole % of each metal component is Co:V:Fe:Mg=21.1:21.0:10.4:47.5.

Catalyst 2 (21.1Co/21.0V/10.4Fe/47.5Mg):

Each of 21.24 g of $Co(NO_3)_2.6H_2O$, 6.61 g of $V_2O_5$, 14.47 g of $Fe(NO_3)_3.9H_2O$ and 42.19 g of $Mg(NO_3)_2.6H_2O$ is separately dissolved in 100 ml of deionized water. The obtained 4 solutions are mixed into 1 solution at room temperature and stirred for 5 minutes (Solution A). 60.16 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. 16.67 g of solid material is obtained after drying and grinding material. Then, the obtained solid material is calcinated at 600° C. for 4 hours under air atmosphere. Finally, 11.19 g of catalyst 2 is obtained. The mole % of each metal component is Co:V:Fe:Mg=21.1:21.0:10.4:47.5.

Catalyst 3 (13.3Co/13.3V/13.4Al/60.0Mg):

Each of 21.24 g of $Co(NO_3)_2.6H_2O$, 6.61 g of $V_2O_5$, 27.81 g of $Al(NO_3)_3.9H_2O$ 13.27 g of MgO is separately dissolved in 100 ml of deionized water. The obtained 4 solutions are mixed into 1 solution at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. Finally, 30.36 g of catalyst 3 is obtained. The mole % of each metal component is Co:V:Al:Mg=13.3:13.3:13.4:60.0.

Catalyst 4 (24.1Co/24.1V/24.5Al/27.3Mg):

Each of 21.24 g of $Co(NO_3)_2.6H_2O$, 6.61 g of $V_2O_5$, 27.81 g of $Al(NO_3)_3.9H_2O$ and 21.10 g of $Mg(NO_3)_2.6H_2O$ is separately dissolved in 100 ml of deionized water. The obtained 4 solutions are mixed into 1 solution at room temperature and stirred for 5 minutes (Solution A). 52.53 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. Finally, 19.62 g of catalyst 4 is obtained. The mole % of each metal component is Co:V:Al:Mg=24.1:24.1:24.5:27.3.

Catalyst 5 (24.1Co/24.1V/24.5Al/27.3Mg):

Catalyst 5 is obtained after calcinating catalyst 4 at 600° C. for 4 hours under air atmosphere. Finally, 12.55 g of catalyst 5 is obtained. The mole % of each metal component is Co:V:Al:Mg=24.1:24.1:24.5:27.3.

Catalyst 6 (39.5Co/39.3V/10.0Al/11.2Mg):

Each of 21.24 g of $Co(NO_3)_2.6H_2O$, 6.61 g of $V_2O_5$, 6.95 g of $Al(NO_3)_3.9H_2O$ and 5.28 g of $Mg(NO_3)_2.6H_2O$ is separately dissolved in 100 ml of deionized water. The obtained 4 solutions are mixed into 1 solution at room temperature and stirred for 5 minutes (Solution A). 32.13 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. 15.53 g of solid material is obtained after drying and grinding material. Then, the obtained solid material is calcinated at 600° C. for 4 hours under air atmosphere. Finally, 9.23 g of catalyst 6 is obtained. The mole % of each metal component is Co:V:Al:Mg=39.5:39.3:10.0:11.2.

Catalyst 7 (25.1Co/25.0V/25.5Al/24.4Si):

Each of 21.24 g of $Co(NO_3)_2.6H_2O$, 6.61 g of $V_2O_5$, 27.81 g of $Al(NO_3)_3.9H_2O$ and 8.69 g of $Na_2.SiO_3$ is separately dissolved in 100 ml of deionized water. The obtained 4 solutions are mixed into 1 solution at room temperature and stirred for 5 minutes (Solution A). 50.60 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. 22.41 g of solid material is obtained after drying and grinding material. Then, the obtained solid material is calcinated at 600° C. for 4 hours under air atmosphere. Finally, 14.57 g of catalyst 7 is obtained. The mole % of each metal component is Co:V:Al:Si=25.1:25.0:25.5:24.4.

Example 2

Preparation of Carbon Nanotube

Carbon nanotubes are prepared in the fixed bed reactor in an experimental scale using the catalysts prepared in Example 1. A selected amount of catalyst is laid in the middle part of quartz pipe in reactor having 10 cm of diameter. The reactor is heated to the desired temperature under nitrogen atmosphere. The mixed gas of 4/0~4/1 volume of ethylene/hydrogen is supplied. The synthesis of carbon nanotube has been carried out for 30 minutes or 1 hour. A corresponding amount of carbon nanotube is prepared. Then, the amount of carbon nanotube is measured as well as the structure and shape of carbon nanotube is analyzed by SEM and TEM analysis. The catalytic yield is measured by following equation. Catalytic yield=100×(Mtotal−Mcat)/(Mcat), wherein Mtotal means the sum of the weight of carbon nanotube and catalyst, and Mcat means the weight of catalyst. Table 1 shows the catalytic yield of catalyst prepared in Example 1. It is definitely clear from Table 1, therefore, that the catalysts of present invention afford the carbon nanotube in a high yield.

Table 1. The summary of carbon nanotube synthesis using the catalyst prepared in Example 1.

| | Component | Catalyst amount | Reaction temp. | Amount of reaction gas | Reaction time | Catalytic yield |
|---|---|---|---|---|---|---|
| Catalyst 1 | 21.1 Co/21.0 V/ 10.4 Fe/47.5 Mg | 61 mg | 650° C. | $C_2H_4$(0.16 L/minute):$H_2$ (0.04 L/minute) | 30 minutes | 2,410% |
| Catalyst 2 | 21.1 Co/21.0 V/ 10.4Fe/47.5Mg | 62 mg | 650° C. | $C_2H_4$(0.16 L/minute):$H_2$ (0.04 L/minute) | 30 minutes | 4,300% |
| Catalyst 3 | 13.3Co/13.3V/ 13.4Al/60.0Mg | 0.5 g | 650° C. | $C_2H_4$(0.80 L/minute) | 30 minutes | 1,640% |
| Catalyst 4 | 24.1Co/24.1V/ 24.5Al/27.3Mg | 0.5 g | 650° C. | $C_2H_4$(0.80 L/minute) | 30 minutes | 2,370% |
| Catalyst 5 (1) | 24.1Co/24.1V/ 24.5Al/27.3Mg | 0.3 g | 650° C. | $C_2H_4$(0.80 L/minute) | 30 minutes | 4,040% |
| Catalyst 5 (2) | 24.1Co/24.1V/ 24.5Al/27.3Mg | 60 mg | 700° C. | $C_2H_4$(0.16 L/minute) | 30 minutes | 4,030% |
| Catalyst 5 (3) | 24.1Co/24.1V/ 24.5Al/27.3Mg | 60 mg | 600° C. | $C_2H_4$(0.16 L/minute):$H_2$ (0.04 L/minute) | 60 minutes | 5,570% |
| Catalyst 5 (4) | 24.1Co/24.1V/ 24.5Al/27.3Mg | 0.2 g | 650° C. | $C_2H_4$(0.8 L/minute):$H_2$ (0.20 L/minute) | 60 minutes | 7,790% |
| Catalyst 6 | 39.5Co/39.3V/ 10.0Al/11.2Mg | 0.2 g | 650° C. | $C_2H_4$(0.80 L/minute):$H_2$ (0.20 L/minute) | 60 minutes | 6,580% |
| Catalyst 7 | 25.1Co/25.0V/ 25.5Al/24.4Si | 0.1 g | 650° C. | $C_2H_4$(0.16 L/minute):$H_2$ (0.04 L/minute) | 30 minutes | 2,580% |

Remarks:
Catalyst 1 is prepared by a coordinated precipitation method using MgO powder. There is no calcination or pre-reduction of catalyst.
Catalyst 2 is prepared without pre-reduction of catalyst.
Catalyst 3 is prepared by a coordinated precipitation method using MgO powder. There is no calcination or pre-reduction of catalyst. Hydrogen gas is not supplied at the time of reaction.
Catalyst 4 is prepared neither calcination nor pre-reduction of catalyst. Hydrogen gas is not supplied at the time of reaction.
Catalyst 5 (1) is prepared without pre-reduction of catalyst. Hydrogen gas is not supplied at the time of reaction.
Catalyst 5 (2) is prepared without pre-reduction of catalyst. Hydrogen gas is not supplied at the time of reaction.
Catalyst 5 (3) is prepared without pre-reduction of catalyst.
Catalyst 5 (4) is prepared without pre-reduction of catalyst.
Catalyst 6 is prepared without pre-reduction of catalyst.
Catalyst 7 is prepared without pre-reduction of catalyst.

Comparative Example 1

Preparation of Catalyst for Preparing Carbon Nanotube

Following catalysts 8~12 have been prepared.
Catalyst 8 (62.3Co/37.7Mg):
Both 39.51 g of $Co(NO_3)_2.6H_2O$ and 21.10 g of $Mg(NO_3)_2.6H_2O$ are separately dissolved in 100 ml of deionized water. The obtained 2 solutions are mixed into 1 solution at room temperature and stirred for 5 minutes (Solution A). 37.93 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. 16.45 g of solid material is obtained after drying and grinding material. Then, the obtained solid material is calcinated at 600° C. for 4 hours under air atmosphere. Finally, 11.20 g of catalyst 8 is obtained. The mole % of each metal component is Co:Mg=62.3:37.7.

Catalyst 9 (63.5Fe/36.5Mg):
Both 57.87 g of $Fe(NO_3)_3.9H_2O$ and 21.10 g of $Mg(NO_3)_2.6H_2O$ are separately dissolved in 100 ml of deionized water. The obtained 2 solutions are mixed into 1 solution at room temperature and stirred for 5 minutes (Solution A). 39.22 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. 18.33 g of solid material is obtained after drying and grinding material. Then, the obtained solid material is calcinated at 600° C. for 4 hours under air atmosphere. Finally, 13.76 g of catalyst 9 is obtained. The mole % of each metal component is Fe:Mg=63.5:36.5.

Catalyst 10 (62.4Ni/37.6Mg):
Both 39.64 g of $Ni(NO_3)_2.6H_2O$ and 21.10 g of $Mg(NO_3)_2.6H_2O$ are separately dissolved in 100 ml of deionized water. The obtained 2 solutions are mixed into 1 solution at room temperature and stirred for 5 minutes (Solution A). 38.02 g of $NH_4.HCO_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. 17.56 g of solid material is obtained after drying and grinding material. Then, the obtained solid material is calcinated at 600° C. for 4 hours under air atmosphere. Finally, 11.89 g of catalyst 10 is obtained. The mole % of each metal component is Ni:Mg=62.4:37.6.

Catalyst 11 (14.9Fe/16.4V/68.7Mg):
Each of 7.14 g of $V_2O_5$, 28.93 g of $Fe(NO_3)_3.9H_2O$ and 13.27 g of MgO is separately dissolved in 100 ml of deionized water. The obtained 3 solutions are mixed into 1 solution at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. Finally, 22.71 g of catalyst 11 is obtained. The mole % of each metal component is Fe:V:Mg=14.9:16.4:68.7.

Catalyst 12 (46.5Co/25.4Al/28.1Mg):

Each of 39.51 g of Co(NO$_3$)$_2$.6H$_2$O, 27.81 g of Al(NO$_3$)$_3$.9H$_2$O and 21.10 g of Mg(NO$_3$)$_2$.6H$_2$O is separately dissolved in 100 ml of deionized water. The obtained 3 solutions are mixed into 1 solution at room temperature and stirred for 5 minutes (Solution A). 50.82 g of NH$_4$.HCO$_3$ is dissolved in 200 ml of deionized water (Solution B). Solution A and Solution B are mixed at room temperature and stirred for 60 minutes. Then, the obtained precipitated solid material is filtered and washed with deionized water, followed by recovering cake shape material. The obtained cake shape material is dried at 120° C. for 12 hours. Then, the dried material is grinded. Finally, 13.24 g of catalyst 12 is obtained. The mole % of each metal component is Co:Al:Mg=46.5:25.4:28.1.

Comparative Example 2

Preparation of Carbon Nanotube

Carbon nanotubes are prepared in the fixed bed reactor in an experimental scale using the catalysts prepared in Comparative Example 1. A selected amount of catalyst is laid in the middle part of quartz pipe in reactor having 10 cm of diameter. The reactor is heated to the desired temperature under nitrogen atmosphere. The mixed gas of 4/0~4/1 volume of ethylene/hydrogen is supplied. The synthesis of carbon nanotube has been carried out for 30 minutes or 1 hour. A corresponding amount of carbon nanotube is prepared. Then, the amount of carbon nanotube is measured as well as the structure and shape of carbon nanotube is analyzed by SEM and TEM analysis. The catalytic yield is measured by following equation. Catalytic yield=100×(Mtotal−Mcat)/(Mcat), wherein Mtotal means the sum of the weight of carbon nanotube and catalyst, and Mcat means the weight of catalyst. Table 2 shows the catalytic yield of catalyst prepared in Comparative Example 1. It is definitely clear from Tables 1 and 2, therefore, that the catalysts prepared according to present invention shown in Example 1 afford much higher yields than those obtained from the catalysts prepared in Comparative Example 1.

Catalyst 11 is prepared by a coordinated precipitation method using MgO powder. There is no calcination or pre-reduction of catalyst. Hydrogen gas is not supplied at the time of reaction.

Catalyst 12 is prepared neither calcination nor pre-reduction of catalyst. Hydrogen gas is not supplied at the time of reaction.

What is claimed is:

1. A catalyst composition for preparing carbon nanotube represented by following formula:

$$[Co_xV_yM1_z]_pM2_q$$

wherein

Co represents catalytic metal of cobalt, its oxide or its derivative;

V represents catalytic metal of vanadium, its oxide or its derivative;

M1 represents at least one catalytic transition metal selected from Al, Fe, Ni, W, Cr, Mn, Sn, Cu, Y, Zr, Ti, Mo or Si, its oxide or its derivative;

M2 represents inactive porous support selected from Mg or Si, its oxide or its derivative;

p and q represent mole fraction of catalytic metal and inactive porous support, respectively;

$p+q=1$, $0.05 \leq p \leq 0.95$, $0.05 \leq q \leq 0.95$;

x, y and z represent mole fraction of Co, V and M1, respectively;

$x+y+z=1$, $0.03 \leq x \leq 0.75$, $0.02 \leq y \leq 0.75$, $0.01 \leq z \leq 0.95$.

2. The catalyst composition for preparing carbon nanotube according to claim 1, wherein M1 represents Al and M2 represents Mg.

3. The catalyst composition for preparing carbon nanotube according to claim 1, wherein the mole fraction of catalytic metal and inactive porous support is $0.10 \leq p \leq 0.90$, $0.10 \leq q \leq 0.90$, respectively; and the mole fraction of Co, V and M1 is $0.10 \leq x \leq 0.60$, $0.10 \leq y \leq 0.60$, $0.05 \leq z \leq 0.70$, respectively.

4. A process for preparing a catalyst composition for preparing carbon nanotube comprising

TABLE 2

The summary of carbon nanotube synthesis using the catalyst prepared in Comparative Example 1.

| | Component | Catalyst amount | Reaction temp. | Amount of reaction gas | Reaction time | Catalytic yield |
|---|---|---|---|---|---|---|
| Catalyst 8 | 62.3Co/37.7Mg | 103 mg | 650° C. | C$_2$H$_4$(0.16 L/minute):H$_2$ (0.04 L/minute) | 60 minutes | 130% |
| Catalyst 9 | 63.5Fe/36.5Mg | 103 mg | 650° C. | C$_2$H$_4$(0.16 L/minute):H$_2$ (0.04 L/minute) | 60 minutes | 120% |
| Catalyst 10 | 62.4Ni/37.6Mg | 53 mg | 650° C. | C$_2$H$_4$(0.16 L/minute):H$_2$ (0.04 L/minute) | 60 minutes | 540% |
| Catalyst 11 | 14.9Fe/16.4V/ 68.7Mg | 0.1 g | 650° C. | C$_2$H$_4$(0.16 L/minute) | 30 minutes | 0% |
| Catalyst 12 | 46.5Co/25.4Al/ 28.1Mg | 0.1 g | 650° C. | C$_2$H$_4$(0.16 L/minute) | 30 minutes | 300% |

Remarks:
Catalyst 8 is prepared without pre-reduction of catalyst.
Catalyst 9 is prepared without pre-reduction of catalyst.
Catalyst 10 is prepared without pre-reduction of catalyst.

i) co-precipitating or coordinated precipitating the catalyst composition;

ii) filtering, drying and grinding the obtained co-precipitated catalyst composition; and iii) calcinating the obtained catalyst composition at 400-800° C. under air atmosphere;

wherein the catalyst composition for preparing carbon nanotube is represented by following formula:

$$[Co_xV_yM1_z]_pM2_q \text{ wherein}$$

Co represents catalytic metal of cobalt, its oxide or its derivative;

V represents catalytic metal of vanadium, its oxide or its derivative;

M1 represents at least one catalytic transition metal selected from Al, Fe, Ni, W, Cr, Mn, Sn, Cu, Y, Zr, Ti, Mo or Si, its oxide or its derivative;

M2 represents inactive porous support selected from Mg or Si, its oxide or its derivative;

p and q represent mole fraction of catalytic metal and inactive porous support, respectively;

$$p+q=1, 0.050 \leq p \leq 95, 0.05 \leq q \leq 0.95;$$

x, y and z represent mole fraction of Co, V and M1, respectively;

$$x+y+z=1, 0.03 \leq x \leq 0.75, 0.02 \leq y \leq 0.75, 0.01 \leq z \leq 0.95.$$

5. The process for preparing a catalyst composition according to claim 4, wherein MgO acts as a co-precipitating agent by directly bonding with catalytic metal salt of the catalyst composition, in a co-precipitating or coordinated precipitating step.

* * * * *